T. E. MURRAY.
VEHICLE WHEEL.
APPLICATION FILED FEB. 1, 1915.
1,139,896.
Patented May 18, 1915.
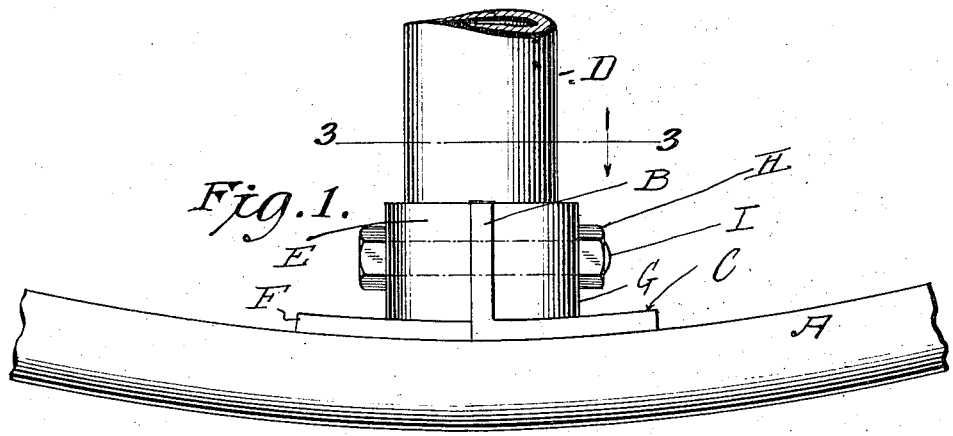
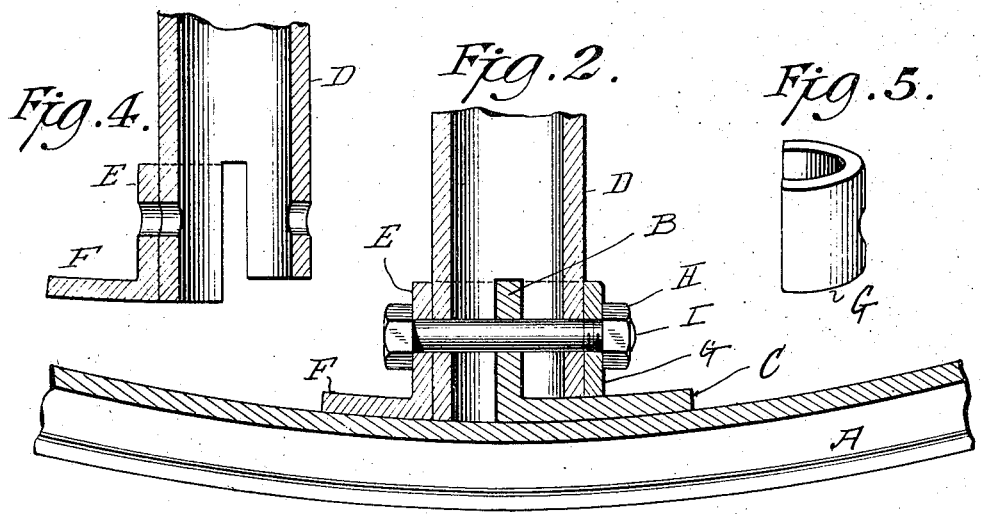
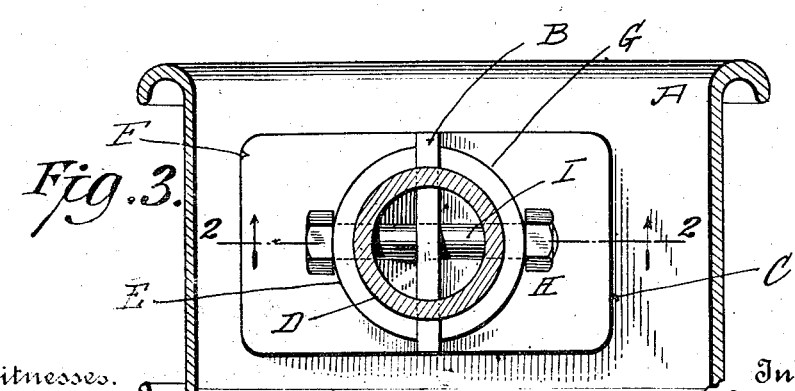
Witnesses.
Inventor
Thomas E. Murray
By his Attorney

UNITED STATES PATENT OFFICE.

THOMAS E. MURRAY, OF NEW YORK, N. Y.

VEHICLE-WHEEL.

1,139,896.   Specification of Letters Patent.   Patented May 18, 1915.

Application filed February 1, 1915. Serial No. 5,580.

*To all whom it may concern:*

Be it known that I, THOMAS E. MURRAY, a citizen of the United States, residing at New York, in the county of New York and State of New York, have invented a certain new and useful Improvement in Vehicle-Wheels, of which the following is a specification.

The invention relates to vehicle wheels, and more particularly to the means for attaching a demountable rim to the ends of the spokes.

The invention consists in the construction hereinafter set forth and pointed out in the claims.

In the accompanying drawings—Figure 1 is a side elevation of a portion of a rim and of a spoke attached thereto by my device. Fig. 2 is a longitudinal section on the line 2, 2 of Fig. 3. Fig. 3 is a section on the line 3, 3 of Fig. 1. Fig. 4 is a longitudinal section of the outer end of a spoke, showing the recesses and openings therein. Fig. 5 is a perspective view of the curved plate G.

Similar letters of reference indicate like parts.

A is a rim of the usual form adapted to receive a tire.

B is an angle piece having a flange C, which is preferably welded to the inner periphery of said rim.

D is a tubular metal spoke having at its outer end a longitudinal recess adapted to receive the angle piece B and cut away on one side of said recess to fit upon the flange C, as best shown in Figs. 2 and 4.

E is a curved plate fitting against the spoke and having a flange F fitting upon the inner periphery of the rim.

G is a curved plate, shown separately in Fig. 5, fitting against the spoke. In angle piece B and curved plates E, G, and also in the wall of spoke A, are openings which receive a headed screw bolt I, secured by nut H.

In assembling the device, the angle piece B is inserted in the recess in the end of spoke A, the curved plates E, G are applied to opposite sides of the spoke, and the bolt I being inserted, clamps said parts firmly together and so secures the rim to the spokes. By this construction, I can apply the rim to the spokes by moving it therefrom in a lateral and inward direction, the angle piece B then sliding into all the recesses in the spokes practically at the same time. Then I can apply the curved plates E, G to each spoke in turn and set up the fastening bolts as already described. In this way, I can quickly substitute a new rim—which may or may not have its tire attached—in place of one which is injured, or the tire of which is injured, without the use of other devices and while the wheel is in place on a vehicle.

I claim:

1. A vehicle wheel, comprising a rim, a transverse projection on the inner periphery thereof, a spoke having at its outer end a longitudinal recess adapted to receive said projection, curved plates on opposite sides of said spoke, and a fastening bolt extending through openings in the wall of said spoke and in said projection and said plates.

2. A vehicle wheel, comprising a rim, an angle piece having a portion welded to the inner periphery of said rim and a portion inwardly projecting therefrom, a spoke having at its outer end a longitudinal recess adapted to receive said projection, two curved plates fitting upon and respectively disposed on opposite sides of said spoke, and a fastening bolt extending through the openings in the wall of said spoke and in said projection and said plates.

3. A vehicle wheel, comprising a rim, an angle piece having a portion welded to the inner periphery of said rim and a portion inwardly projecting therefrom, a spoke having at its outer end a longitudinal recess adapted to receive said projection, a curved plate fitting upon said spoke and bearing at one end upon the welded portion of said angle piece, a second curved plate fitting upon the opposite side of said spoke and having a flange bearing upon the inner periphery of said rim, and a fastening bolt extending through openings in the wall of said spoke and in said projection and said plates.

In testimony whereof I have affixed my signature in presence of two witnesses.

THOMAS E. MURRAY.

Witnesses:
  GERTRUDE T. PORTER,
  MAY T. McGARRY.